United States Patent [19]

Dombroski et al.

[11] Patent Number: 4,547,329

[45] Date of Patent: Oct. 15, 1985

[54] PROCESS FOR FORMING COPOLYMER PARTICLES

[75] Inventors: John R. Dombroski; J. Maynard Hawkins, both of Kingsport; Mark A. Pollock, Johnson City; Alan P. Leonard; Thomas A. Mitchell, both of Kingsport, all of Tenn.

[73] Assignee: Eastman Kodak Company, Rochester, N.Y.

[21] Appl. No.: 547,309

[22] Filed: Oct. 31, 1983

[51] Int. Cl.$^4$ ................................................. D01F 6/14
[52] U.S. Cl. ................................ 264/118; 264/141; 264/143; 264/145; 264/185; 264/331.15; 521/64; 524/557
[58] Field of Search ............... 264/118, 141, 145, 185, 264/143, 331.15; 524/557; 521/64

[56] References Cited

U.S. PATENT DOCUMENTS

| | | | |
|---|---|---|---|
| 2,072,302 | 3/1937 | Herrmann et al. | 264/185 |
| 2,948,697 | 8/1960 | Robertson | 524/557 |
| 3,585,177 | 6/1971 | Gardner et al. | 525/62 |
| 3,663,674 | 5/1972 | Holiday | 264/118 |
| 3,753,962 | 8/1973 | Restaino | 264/143 |
| 3,847,845 | 11/1974 | Tada | 264/184 |
| 3,925,336 | 12/1975 | Sawada | 525/62 |
| 3,997,489 | 12/1976 | Coker | 524/557 |
| 4,094,942 | 6/1978 | Nakai et al. | 264/141 |
| 4,240,993 | 12/1980 | Sun | 264/185 |
| 4,320,041 | 3/1982 | Abe et al. | 264/185 |
| 4,358,550 | 11/1982 | Jacono et al. | 264/141 |

Primary Examiner—Jeffery Thurlow
Assistant Examiner—Patrick Dailey
Attorney, Agent, or Firm—John F. Stevens; Daniel B. Reece, III

[57] ABSTRACT

Disclosed is a process for the formation of olefin-vinyl alcohol copolymer pellets which comprises mixing particles of the copolymer with water to obtain a wet cake containing about 20–70% solids by weight to thereby obtain a plasticized mass of the copolymer, thereafter extruding the copolymer at a temperature of about 5°–7° C. below the melting point of the mass through a nozzle to form a rod, and dividing the rod into individual pellets.

6 Claims, No Drawings

PROCESS FOR FORMING COPOLYMER PARTICLES

DESCRIPTION

1. Technical Field

This invention relates to a process for the extrusion and pelletization of water-plasticized ethylene-vinyl alcohol copolymers.

2. Background Art

Ethylene-vinyl alcohol copolymers (sometimes referred to herein as EVOH) are typically produced commercially by a process which involves (1) copolymerization of ethylene and vinyl acetate, (2) hydrolysis of the ethylene-vinyl acetate copolymer, (3) separation and purification of the EVOH, and (4) various recovery and recycle operations.

U.S. Pat. No. 3,847,845 deals with step separation and purification of EVOH. This patent employs a mixed solvent (methanol/water) system for the EVOH and residual sodium acetate.

At an appropriate temperature, pressure, and composition, the solution is cooled and extruded through a die into a coagulation/quench bath containing water and methanol of controlled temperature and composition to produce a rod or sheet. The resulting chopped pellets or sheet produced from the EVOH are claimed to be sufficiently porous to permit washing. Consequently, residual sodium acetate and impurities are removed and the pellets are dried.

U.S. Pat. No. 3,925,336 describes a process for preparing granular ethylene-vinyl alcohol copolymer having uniform size and shape without passing through a step of crushing. The patent describes carrying out the hydrolysis by suspending an alcohol solution of ethylene-vinyl acetate (EVA) copolymer in a nonsolvent substantially incapable of dissolving the ethylene-vinyl acetate copolymer or the ethylene-vinyl alcohol copolymer and immiscible with the alcohol.

In the present invention, it has been discovered that water can be used to plasticize EVOH sufficiently to extrude and pelletize the copolymer at relatively low temperatures. The need for precipitating the copolymer in organic solvents and melting the copolymer is eliminated, thus overcoming the undesirable effects of excessive heat such as discoloration.

DISCLOSURE OF THE INVENTION

According to the present invention, there is provided a process for the formation of olefin-vinyl alcohol copolymer pellets which comprises mixing particles of the copolymer with water to obtain a wet cake containing about 20-70% solids by weight to thereby obtain a plasticized mass of the copolymer, thereafter extruding the water-plasticized copolymer at a temperature substantially below the boiling point of water through a nozzle to form a rod, and dividing the rod into individual pellets.

Olefin/vinyl alcohol copolymers useful in this invention include those wherein the olefin content of the copolymer is between about 5.0 and about 40% by weight and the residual ester content of the vinyl alcohol portion is below 3.0%. It is preferred that the differential thermal analysis curve for the copolymer be a single narrow endotherm having a melting range of less than 30° C. Also, the olefin content of the copolymer should be maintained within a narrow distribution range and significant amounts of homopolymer segments of either olefin or vinyl alcohol should be avoided.

The olefin distribution range and the presence of homopolymers is most conveniently measured using differential thermal analysis (DTA) techniques. The differential thermal analysis (DTA) is carried out according to the procedure set forth by D. A. Vassallo and J. C. Harden in Analytical Chemistry, volume 34, January, 1962, pages 132-5, using a DuPont 900 Differential Thermal Analyzer programmed at a 30° C./minute rate. A DTA curve wherein the curve is characterized by a single narrow melting endotherm having a range of less than 30° C. indicates a narrow olefin distribution in the copolymer.

An example of the preparation of a preferred ethylene/vinyl alcohol copolymer is as follows.

1250 grams of vinyl acetate monomer is charged to a one-gallon stainless steel autoclave equipped with an internal cooling coil and agitation means. The vessel and contents are cooled to 15° C. by circulating cold water in the cooling coil. 1.125 grams of solid isopropyl percarbonate is added to 1250 grams of vinyl acetate previously cooled to $-40°$ C. The percarbonate dissolves readily with gentle agitation and the solution is then poured into the autoclave. The autoclave is pressurized while maintaining agitation, with 10 p.s.i.g. (7.03 kg/cm$^2$ gage) ethylene and then vented to zero p.s.i.g. (atmospheric pressure). The autoclave is purged twice again in the same manner in order to remove any oxygen from the autoclave and its contents. Then the reaction temperature is increased to 45° C. by means of an external electrical heating mantle; the pressure is 100 p.s.i. (7.03 kg/cm$^2$) before heating and additional ethylene is added to bring the pressure to 450 p.s.i. (31.6 kg/cm$^2$) simultaneously with the temperature rise to 45° C. The reaction temperature is controlled between 45 and 46° C. The autoclave is vented several times during the run in order to maintain a constant pressure of 450 p.s.i. (31.6 kg/cm$^2$). The cooling of the monomer and the simultaneous increase in temperature and pressure is carried out to avoid any premature polymerization that would result in any homopolymer segments. After four hours reaction time a monomer conversion of 35.8% is achieved and the autoclave contents are cooled rapidly to 20° C. without venting of pressure and the contents are dumped into two volumes of methanol containing 0.1% by weight of inhibited styrene monomer which acts to rapidly quench the polymerization process and avoid residual polymerization that may produce segments of homopolymer. The ethylene/vinyl acetate resin is recovered within 24 hours by disintegration of the varnish into several volumes of hexane. The resin, which is dried overnight at 75° C., has an ethylene content of 13.5% by weight and a viscosity number of 0.763 dl./g. in toluene (0.25 g./100 ml.) at 25° C.

The foregoing ethylene/vinyl acetate polymer is hydrolyzed to form ethylene/vinyl alcohol polymer having less than 3% residual vinyl acetate groups. The hydrolysis is carried out using a 4% by weight solution of sodium hydroxide in methanol according to the procedures well known to those skilled in the art.

The hydrolyzed ethylene/vinyl alcohol resin has a viscosity number of 1.414 dl./g. in dimethyl sulfoxide (0.25 g./100 ml.) at 25° C.

A differential thermal analysis (DTA) curve of the hydrolyzed polymer shows a single narrow melting endotherm (DTA) having arange of 15° C. with a minimum at 177° C. The narrow endotherm indicates that the ethylene/vinyl alcohol polymer has a narrow ethylene distribution, i.e., the individual chain segments that make up the polymer mass have a narrow ethylene distribution around a mean which is the total amount of ethylene in the copolymer. The single melting endotherm indicates that the polymer does not have significant amounts of homopolymer in the resin.

Suitable vinyl esters which can be copolymerized with the olefin comonomers and subsequently hydrolyzed to form the olefin/vinyl alcohol copolymers include vinyl ester monomers of the general formula:

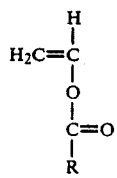

wherein R is selected from the group comprising hydrogen, alkyl groups of from 1 to 10 carbon atoms, aryl groups of from 6 to 10 carbon atoms including the carbon atoms in ring substituted alkyl substituents, e.g., vinyl formate, vinyl acetate, vinyl propionate, vinyl butyrate, vinyl benzoate and the like. Preferably, the vinyl ester is vinyl acetate.

The preferred olefin/vinyl alcohol materials are ethylene/vinyl alcohol copolymers and wherein the olefin content is from 5 to 40 weight percent based on the weight of the copolymer. The residual ester content of the copolymer should be less than 3% and prefeably less than 2% by weight. Most preferably the residual ester content is less than 1% by weight. In general, olefins having 2 –6 carbon atoms may be used, but ethylene is preferred.

The preferred ethylene/vinyl alcohol copolymer resins will contain less than 2% homopolymers. Especially preferred are homopolymers with less than 1% homopolymer. An example of a preferred copolymer is EVAL F resin marketed by Kuraray Company.

In the preparation of the preferred copolymers, the ethylene and the vinyl ester are polymerized in the presence of a free radical initiator to a conversion of from 20 to 70% at temperatures between $-50°$ C. and $100°$ C.

The choice of initiator system is based on the necessity for minimizing chain transfer reactions such as hydrogen abstraction; solubility in the polymerization medium; and a half-life for radical generation generally between 0.1 to 100 hours and preferably between 0.5 to 5 hours. These initiator considerations are well known to those skilled in the art and need no further discussion here.

Examples of suitable initiators that meet the above requirements include the alkyl boranes such as triethyl borane, tripropyl borane, tributyl borane, etc. Tributyl borane is especially preferred for polymerization at subambient temperatures. Also included are azobis compounds such as axobisisobutyro-nitrile; organic and inorganic peroxy and hydroperoxy compounds such as salts of persulfuric acid, benzoyl peroxide, isopropyl percarbonate, hydrogen peroxide, etc.; the so-called redox combinations such as t-butylhydroperoxide/sodium formaldehyde sulfoxalate, etc.

Organic solvent, which may also be included in the polymerization charge, has the advantage of tending to increase the ethylene content of the polymer for a given polymerization pressure. Solvents are also useful for limiting the molecular weight achieved during polymerization. For this reason solvents are not used at all when it is desired to maximize molecular weight. For example, only 1% of methanol on the charge causes a significant reduction in polymer molecular weight. Examples of suitable solvents include alcohols, ketones, esters, aromatic hydrocarbons, etc.

In order to obtain a copolymer suitable for use in this invention, wherein the copolymer has a narrow range of olefin distribution and has no significant amounts of homopolymer, certain critical steps in the polymerization process must be observed. An outline of these steps is set forth below.

(1) Monomer conversion should be held to amounts in the range of from 1 to 70% conversion with 5 to 45% being the preferred range.

(2) Prior to and during the polymerization reaction, the reactor system and reactants, solvents, should be purged free of oxygen.

(3) Conditions which would permit polymerization prior to the stabilization reaction temperature and olefin pressure or during the recovery step should be avoided.

(4) A constant temperature and constant olefin pressure should be maintained during the polymerization reaction. In this regard, the temperature should be maintained within $\pm 5°$ C. and the olefin pressure with $\pm 5\%$ of the pressure specified for any given system.

Such olefin/vinyl alcohol polymers and their preparation are known in the art. See, for example, U.S. Pat. No. 3,585,177, the specification of which is incorporated herein by reference.

In the process described above, the EVOH copolymer precipitates in the methanol as the alcoholysis reaction proceeds. Methyl acetate is the by-product.

When sodium hydroxide is used as the basic catalyst for the alcoholysis reaction, sodium acetate is formed.

When a degree of hydrolysis of the EVOH copolymer greater than about 97% has been achieved, the EVOH copolymer is collected by filtration and washed several times with water to remove sodium acetate. It is desirable to remove the alcoholysis catalyst and sodium acetate from the EVOH copolymer by washing the product with water. The presence of sodium acetate and/or sodium hydroxide causes discoloration and degradation when the copolymer is thermally processed above its melting temperature for the purpose of molding, spinning, or extruding.

This invention also comprises dewatering the EVOH filter cake followed by extrusion of the water-wet filter cake. In essence, the dewatering step removes the bulk, or easily removed, water from a wet EVOH/water filter cake. The dewatered cake is extruded at a temperature below $100°$ C. to yield an elastic rod which easily chops upon cooling. Photo-micrographs of these pellets reveal a porous, sponge-like structure clad in a thin sheath. This structure facilitates final drying of the pellets.

EVOH copolymer as defined herein as being useful in the process of this invention normally has a melting point of about $150°-210°$C., depending on the ethylene content of the copolymer. When mixed with a plasticizing amount of water, i.e., about 30-80% by weight, the melting point is reduced to less than $100°$ C. The melting point of the preferred copolymer described herein is about $178°-180°$C. When mixed with water to a solids content of about 20–40% by weight until a homogeneous mass is obtained, the melting point is lowered to about 70–80° C.

Thus, extrusion of this plasticized mass should occur at about 63°–73° C. Extrusion of the plasticized mass may be accomplished by apparatus well known in the art such as, for example, conventional single screw extruders, screw-type dewatering presses, and many types of compounding extruders. The rods so extruded are then divided into individual pellets by apparatus well known in the art such as, for example, common types of rod (strand) pelletizers.

The following examples are submitted for a better understanding of the invention.

EXAMPLE 1

The EVOH copolymer prepared for use in the examples of this invention is obtained by alcoholysis of ethylene-vinyl acetate (EVA) copolymer. The EVA copolymer is prepared by charging a stirred autoclave with 900 g of distilled vinyl acetate, 112.5 g methyl alcohol, and 0.75 g of 2,2'-azobis(isobutyronitrile). The autoclave is pressurized with 300 psi ethylene and the temperature was increased to 60° C. The ethylene pressure was then increased to 33.4 Kg/cm$^2$ and maintained at that pressure for six hours. The viscous polymer solution is removed from the autoclave and evaporated to dryness. Five hundred and twenty grams of EVA copolymer is obtained. The EVA copolymer has an inherent viscosity in PTCE solvent of 1.15 dl/g and a composition analysis of 31.8 mole % ethylene.

The alcoholysis of the EVA copolymer is carried out by dissolving 520 g of EVA copolymer in methyl alcohol to form a 10% solution. The alcoholysis catalyst solution is prepared by dissolving 15.6 g of sodium hydroxide in 800 mL of methyl alcohol. The EVA/methanol solution is added to the sodium hydroxide catalyst solution over a period of two hours. The reaction temperature is 47°–50° C. The precipitated EVOH copolymer is filtered and washed with 3 L of methyl alcohol, filtered and then washed with 4 L of 0.5% aqueous acetic acid. The EVOH copolymer is filtered a final time. The solids level is about 24%.

EXAMPLE 2

The starting material for Example 2 is the wet filter cake, described in Example 1. This cake consists of EVOH and water at approximately 24% solids. First, the cake is dewatered to approximately 36% solids. A small Carver press is used at a pressure of approximately 63.3 Kg/cm$^2$ gage. This pressed cake is then extruded using a small 1.3 cm laboratory extruder. Extrusion temperatures were varied up to 100° C. (boiling point of water). Operation at 75° C. yields the best quality elastic rod which is easily air cooled and chopped into pellets. The pellets are then dried to the desired conditions. Examination of the extruded pellets under a microscope shows that the cross-section is composed of spongy, porous inner core surrounded by a thin, smooth sheath or shell. The porous core is advantageous to rapid drying of the pellets. The smooth sheath is advantageous to providing a free flowing material that can be easily moved through hoppers and feed ports.

EXAMPLE 3

In Example 3, the wet cake starting material (Example 1) is simply dried completely. The dried EVOH is extruded in a conventional manner at about 220° C., quenched in a water bath, pelletized, and dried to the desired condition. The pellets produced in this manner have a smooth, glossy nonporous, structure.

EXAMPLE 4

In Example 4, the wet cake starting material, prepared in Example 1, is force fed into a 1.9 cm extruder with a secondary feed/vent port. Some of the water is removed at the vent port. The feed section is kept cool (~25° C.). The vented section is run at various temperatures (~100±25° C.). The metering section and die are maintained <100° C. to prevent foaming (~75 to 80° C.). A highly porous pellet resulted due to inadequte water removal with the existing equipment configuration.

EXAMPLE 5

In Example 5, the wet cake starting material (Example 1) was force fed into a 1.3 cm extruder with no intermediate venting. Extrusion temperature between 65–85° C. yielded an elastic but highly porous extrudate. In this example, the extrudate was noticeably nonuniform, encapsulating liquid water bubbles into the rod and squirting from the die face. Finally, some of the excess water vented back to the feed zone. As in Example 4, less than optimum pellets were produced, indicating a need to remove excess water prior to final metering and passage through the die.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. Process for the formation of olefin-vinyl alcohol copolymer pellets, said polymer having less than 3% vinyl acetate, which comprises mixing particles of said copolymer with water to obtain a wet cake containing about 20–70% solids by weight to thereby obtain a plasticized mass of the copolymer, thereafter extruding the mixture of the copolymer and water at a temperature of about 5–7° C. below the melting point of the mass through a nozzle to form a rod, and dividing the rod into individual pellets.

2. Process according to claim 1 wherein the olefin content of the copolymer is between about 5.0% and about 40% by weight and the residual ester content of the vinyl alcohol portion is below 3%.

3. Process according to claim 1 wherein the olefin is ethylene.

4. Process according to claim 2 wherein the olefin is ethylene.

5. Process according to claim 1 wherein said wet cake contains about 20–40% solids by weight.

6. Process according to claim 1 wherein said mixture of the copolymer and water is extruded at a temperature of about 63°–73° C.

* * * * *